(12) United States Patent
Huber et al.

(10) Patent No.: US 9,882,520 B2
(45) Date of Patent: Jan. 30, 2018

(54) METHOD FOR CONTROLLING THE MOVEMENT OF A DRIVE AXIS OF A DRIVE UNIT

(71) Applicant: B&R INDUSTRIAL AUTOMATION GMBH, Eggelsberg (AT)

(72) Inventors: Stefan Huber, Salzburg (AT); Helmut Herzog, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 15/424,027

(22) Filed: Feb. 3, 2017

(65) Prior Publication Data

US 2017/0229991 A1    Aug. 10, 2017

(30) Foreign Application Priority Data

Feb. 5, 2016 (AT) ............... A 50073/2016

(51) Int. Cl.
*H02K 41/00* (2006.01)
*H02P 25/06* (2016.01)
*B65G 43/00* (2006.01)

(52) U.S. Cl.
CPC .............. *H02P 25/06* (2013.01); *B65G 43/00* (2013.01); *B65G 2203/047* (2013.01)

(58) Field of Classification Search
CPC .......... H02P 6/00; H02P 25/06; H02K 41/00; H02K 41/02; H02K 41/025; H02K 41/03; H02K 41/06; H02K 33/18

USPC ........ 318/568.17, 568.18, 560, 687, 34, 38, 318/135, 64, 66, 799; 701/479, 535; 702/146, 199; 327/532, 552, 554; 324/76.29, 76.44, 76.68; 198/570, 619

See application file for complete search history.

(56) References Cited

U.S. PATENT DOCUMENTS

| 4,603,286 | A | 7/1986 | Sakano |
| 5,073,748 | A | 12/1991 | Boehm |
| 5,351,205 | A | 9/1994 | Hoos |
| 8,527,092 | B2 * | 9/2013 | Hacker ................ B25J 9/1641 700/1 |
| 8,863,669 | B2 | 10/2014 | Young et al. |

FOREIGN PATENT DOCUMENTS

| EP | 0 419 705 | 4/1991 |
| EP | 0 477 412 | 4/1992 |

* cited by examiner

*Primary Examiner* — Antony M Paul
(74) *Attorney, Agent, or Firm* — Greenblum & Bernstein, P.L.C.

(57) ABSTRACT

To be able to activate a smoothing filter for a setpoint, with which the movement of a drive axis (A, Ai) of a drive unit (AE) can also be controlled during the movement without a negative effect on the movement, it is provided that the smoothing filter (10) is initialized with a setpoint profile $(S_{init})$ so that a current movement phase $((S_0, \dot{S}_0, \ldots, S_0^{(x)}))$ is continued continuously and the repeated time derivative $(S^{(x+1)})$ of the highest time derivative $(S^{(x)})$ of the setpoint $(S(t), S(k))$ is limited.

3 Claims, 5 Drawing Sheets

METHOD FOR CONTROLLING THE MOVEMENT OF A DRIVE AXIS OF A DRIVE UNIT

CROSS-REFERENCE TO RELATED APPLICATIONS

The present application claims priority under 35 U.S.C. § 119(a) of Austria Patent Application No. A50073/2016 filed Feb. 5, 2016, the disclosure of which is expressly incorporated by reference herein in its entirety.

BACKGROUND OF THE INVENTION

1. Field of the Invention

The present invention relates to a method for controlling the movement of a drive axis of a drive unit, wherein the movement of the drive axis is controlled in a cycle step by specifying a setpoint of the movement, by means of which there results a movement phase of the movement of the drive axis, wherein a smoothing filter in the form of an averaging filter calculates the new setpoint as the mean value of the previous setpoints at a filter time in the past.

2. Discussion of Background Information

Long-stator linear motors are often used as flexible conveying devices in manufacturing lines, processing lines, assembly lines and similar systems. As is known, a long-stator linear motor consists substantially of a long stator in the form of a multiplicity of drive coils arranged one after the other, and a multiplicity of transport units with excitation magnets (permanent or electromagnets) which are moved along the long stator by applying an electrical current appropriately to the drive coils. As a result of the drive coils, a moving magnetic field is produced which interacts with the excitation magnets on the transport units in order to move the transport units. A conveyor line, along which the transport units can be moved, is therefore formed by the long stator. It is thus possible to control each transport unit individually and independently of one another in its movement (position, velocity, acceleration). For this purpose, each drive coil is activated by an associated drive coil controller which can receive commands to move a transport unit (e.g. in the form of setpoints for position or velocity) from a superordinate system control unit. At the same time, track switches or merging conveyor sections of the long-stator linear motor can be provided along the conveyor line. The long stator is also often constructed in the form of conveyor segments, wherein each conveyor segment forms part of the conveyor line and contains a number of drive coils. Usually, a segment controller, which controls all drive coils of the conveyor segment, is provided for a conveyor segment. The structural design of the long-stator linear motor, that is to say, for example, the design of the drive coils, the conveyor line, the transport units, the transport unit guides, etc., can, of course, be different, wherein, however, the basic functional principle of a long-stator linear motor remains the same.

A conveyor device in the form of a long-stator linear motor can become quite complex with a plurality of transport sections which can be connected to one another by means of track switches. A large number of transport units can be moved simultaneously on these. Such a conveyor device therefore imposes high demands on the control of the movement of the individual transport units.

U.S. Pat. No. 8,863,669 B2 describes, by way of example, a conveyor device in the form of a long-stator linear motor with a transport unit controller. Herein, the conveyor line is divided into zones, wherein a transport unit in a setpoint-based zone is controlled based on a setpoint command, and, in a limit-based zone, is controlled by means of commands for the end position and maximum values for the velocity and acceleration. With the limit-based control, these commands are converted into a movement profile with which the transport unit is moved.

There are various possibilities as to how the movement of a transport unit can be controlled or regulated. For example, a distance coupling, with which a slave transport unit is coupled to the movement of a master transport unit, would be conceivable. The slave transport unit follows the master transport unit at a specified constant distance. Instead of a constant distance, the distance could also vary along the movement, for example in the form of a specified curve. A movement in the form of an inverse kinematic, with which the movement of the transport unit is synchronized to the movement of another unit in space, is also conceivable. An example of this is the synchronization of a transport unit to the movement of a robot arm which carries out work on a workpiece on the transport unit. A position control, in which a control difference, based on which the setpoint position is varied in order to equalize the control difference to zero, is specified, is also possible. An application of this could be the exertion of a process force between two transport units. However, the invention is not restricted to a conveyor device in the form of a long-stator linear motor but applies generally to drive axes of a drive.

In most cases, a target velocity or a target position, which is to be set or approached by the drive, is specified for a drive axis. This type of movement of a drive axis is also referred to in the following as target mode. In target mode, the target velocity or target position is converted into a position profile or, as an equivalent, also into a velocity profile, which is followed by the drive axis. A typical example of the specification of target velocities is a crane where the slewing velocity of the crane arm is controlled by means of a control element, e.g. a joystick. In target mode, limits for the jerk, which is defined as the time derivative of the acceleration, are often specified in order to reduce the load on the drive axis. So-called smoothing filters, which limit the change in acceleration (that is to say the jerk), are often used for this purpose. Such smoothing filters are often designed as low-pass filters or as averaging filters. In many applications, such as cranes for example, a limit of the time derivative of the jerk is also desired.

It would, of course, also be possible to generate movement profiles which are inherently jerk-limited. However, the generation of such movement profiles is very calculation-intensive. Particularly in the case of applications such as a conveyor device in the form of a long-stator linear motor where there is a multiplicity of transport units to be moved, the limits of available computational power are quickly reached. For this reason, in many applications, only simple movement profiles, which are subsequently jerk-limited in a smoothing filter, are generated for a drive axis.

U.S. Pat. No. 4,603,286 A describes a higher-order low-pass filter. However, such low-pass filters are likewise calculation-intensive. For a conveyor device having a multiplicity of transport units, the computational effort would increase enormously, as a result of which such low-pass filters can hardly be used for this application. Irrespective of this, low-pass filters have the characteristic that the output of the filter only adapts exponentially to the input but never reaches it. This makes low-pass filters rather uninteresting for accurate control with low tracking error (deviation between setpoint and actual value).

EP 419 705 A1 and EP 477 412 A1 each describe a jerk limitation with a simple averaging filter which forms the mean value over a specified number of previous position commands in order to calculate the new setpoint for the position command. Although these averaging filters require less computational power, they assume that previous position commands are known in order to be able to calculate a mean value from the previous values. This is the case when the smoothing filter is always active, that is to say from standstill at the beginning of the movement to the end of the movement.

However, it is possible that a smoothing filter in the form of a averaging filter is only to be activated during a movement of a drive axis, that is to say not from the very beginning, for example when the system switches from a movement mode, e.g. inverse kinematic, to the target mode. In this case, an undesirable movement behavior of the drive axis occurs depending on how the smoothing filter is initialized at the time of activation (filled with values for the previous time period). If the smoothing filter has simply been initialized with the previous setpoints, then a setpoint step would occur at the time of activation which would burden the drive axis controller and the components of the drive. In the worst case, the control could become unstable. If initialization takes place with the setpoint at the time of activation, then this could result in a velocity or acceleration step, which is likewise undesirable and may have similar consequences.

SUMMARY OF THE EMBODIMENTS

Embodiments of the present invention are directed to a method which enables, with little computational effort, the movement of a drive axis of a drive unit to be controlled by specifying setpoints, wherein a smoothing filter in the form of a averaging filter can also be activated during the movement of the drive axis while maintaining the specified kinematic limits, in particular the jerk or the change in the jerk with respect to time.

According to the invention, it can be ensured that the movement is continued continuously also after activating the smoothing filter at the current movement phase. At the same time, this enables the output of the smoothing filter to be continuous and therefore differentiable, by means of which the repeated time derivative of the highest time derivative in the movement phase, e.g. the jerk or the change in the jerk with respect to time, is limited. In this way, the smoothing filter can be activated without negative effects at any time, in particular also during a movement of the drive axis, and not only at the beginning of the movement.

Preferably, a constant function is assumed for the highest time derivative of the setpoint for the previous time interval. This enables the computational effort for determining the setpoint profile for initialization to be reduced, as the lower derivatives, and therefore also the setpoint profile for initialization, can easily be calculated therewith.

It is quite particularly advantageous when the setpoint is updated and buffered in a circular buffer in every cycle step, wherein the updated setpoint shifts the oldest setpoint out of the circular buffer, wherein the setpoints stored in the circular buffer form the setpoint profile for initializing the smoothing filter. In this way, the setpoint profile for initializing the smoothing filter is available when activating the smoothing filter, which considerably reduces the effort and time for initialization.

BRIEF DESCRIPTION OF THE DRAWINGS

The present invention is explained in more detail below with reference to FIGS. 1 to 8, which show advantageous embodiments of the invention in an exemplary, schematic and non-restricting form. In the drawing

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The smoothing filter 10 according to the invention is described below with reference to FIG. 1, without restricting generality, in conjunction with a transport unit TEi of a conveyor device 1 in the form of a long-stator linear motor. Here, a transport unit TEi of the conveyor device 1 is seen as a driven drive axis Ai and the conveyor device 1 forms the drive unit AE. A long-stator linear motor as conveyor device 1 therefore has as many drive axes Ai as there are transport units TEi which are moved upon it.

Figure 2:
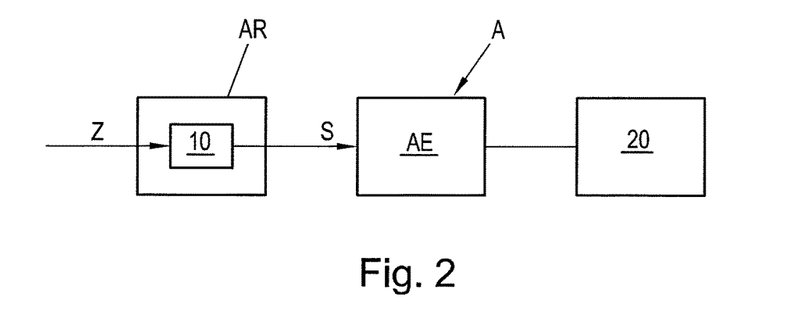
FIG. 2 shows a drive axis of a drive unit with drive axis controller and smoothing filter.

However, it must be noted that the smoothing filter 10 can be used generally on driven drive axes A of a drive unit AE (FIG. 2), wherein the driven drive axis A is controlled by a drive axis controller AR and setpoints S, e.g. in the form of positions p or velocity v. The smoothing filter 10 can be implemented in the drive axis controller AR but can also be implemented separately therefrom. A drive axis A of a drive unit AE moves a moving part 20 of the drive in accordance with the specified setpoints S in a possible movement direction. The terms single-axis or multi-axis drive are used depending upon the number of possible movement directions of the drive unit AE. For example, a conventional electric motor for moving a unit driven thereby in one direction (rotary or translatory) is a single-axis drive with a drive axis A of a drive unit AE. An example of this is, for example, a single-axis drive for an elevator or the slewing drive of a crane. The sliding door of the elevator is likewise moved by a single-axis drive. The drive of a worktable which can be moved in a plane in both directions by a drive unit AE would be a two-axis drive. Likewise, a transport unit TEi which interacts with drive coils $AS_{ij}$ of the conveyor device 1 is a single-axis $A_i$ with direction of movement in the direction of the conveyor line 2. The transport unit TEi then constitutes the moving part 20.

Figure 1:
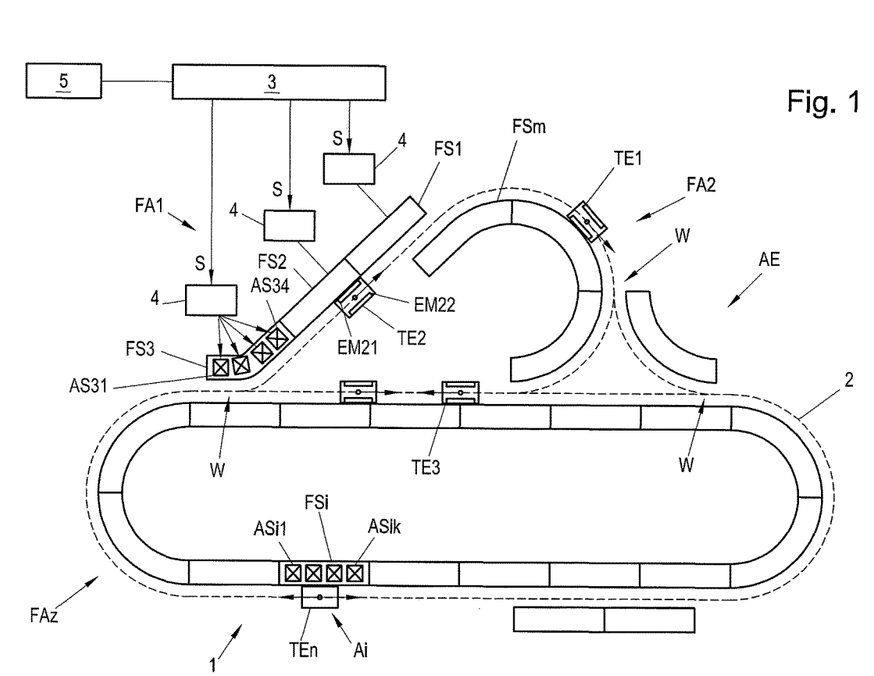
FIG. 1 shows a drive unit in the form of a conveyor device as a long-stator linear motor with transport units as drive axes.

By way of example, an arbitrary design of a conveyor device 1 with a conveyor line 2 (shown by the dashed line) is shown in FIG. 1. The conveyor device 1 is designed as a long-stator linear motor, and a multiplicity of transport units TEi, i=1, . . . , x, which can be moved along the conveyor line 2, is provided. The conveyor line 2 is substantially specified by the long stator of the long-stator linear motor 1. In the exemplary embodiment shown, a series of conveyor segments FSi, i=1, . . . , y, which define the path of the transport units TEi, that is to say the conveyor line 2, is provided. Individual conveyor sections FAi, i=1, . . . , z of the conveyor line 2 are formed by a series of conveyor segments FSi arranged adjacent to one another. In doing so, the conveyor segments FSi form part of the long stator of the long-stator linear motor. The conveyor segments FSi are fixedly arranged in a suitable structure and usually also form guide elements, along which the transport units TEi can be guided. Each conveyor section FAi comprises at least one conveyor segment FSi, normally a plurality of conveyor segments FSi. Individual conveyor sections FAi, or conveyor segments FSi of individual conveyor sections FAi (such as the conveyor segments FS1, FSm for example), can also partially overlap one another, in particular in areas of the conveyor line 2 at which a transition occurs from one conveyor section FAi to another conveyor section FAi (such as from conveyor section FA1 to conveyor section FA2 for example). It can also be provided that conveyor segments FSi are partially arranged on both sides of the conveyor line 2. Track switches W, at which (depending on the conveying direction of a transport unit TEi) two conveyor sections FAi are merged or a separation onto two conveyor sections FAi occurs, can also be provided. It is understandable that an almost arbitrarily designed conveyor line 2, which does not only have to be located in a two-dimensional plane but can also extend three-dimensionally, can be formed in this way.

Each conveyor segment FSi comprises a number k of drive coils ASij, j=1, . . . , k, wherein the number k does not have to be the same for each conveyor segment FSi. For clarity, only drive coils ASij of some conveyor segments FSi are shown in FIG. 1. Each transport unit TEi comprises a number of excitation magnets EMij, j=1, . . . , 1, preferably on both sides (referred to the conveying direction which is indicated by the arrows on the transport units TEi) of the transport units TEi. When the conveyor device 1 is operating, the drive coils ASij interact in a known manner with the excitation magnets EMij of the transport units TEi in accordance with the motor principle. If the drive coils ASij in the region of a transport unit TEi are energized with a coil current, a magnetic flux is produced which, in conjunction with the excitation magnets EMij, exerts a force on the transport unit TEi. Depending on the coil current, this force can comprise a forward-driving-force-forming force component and a lateral-force-forming force component. The forward-driving-force-forming force component serves substantially to move the transport unit TEi, and the lateral-force-forming force component can be used to guide the transport unit TEi and also to define the path of the transport unit TEi at a track switch W. In this way, each transport unit TEi can be moved individually and independently of one another along the conveyor line 2 by energizing the drive coils ASij in the region of each transport unit TEi with an appropriate coil current in accordance with the movement to be executed.

This basic principle of operation of a long-stator linear motor is well-known and is therefore not discussed in more detail. For the present invention, it is also irrelevant how the transport units TEi, the conveyor segments FSi, the drive coils ASij, the excitation magnets EMij, etc. are specifically structurally designed, for which reason they are also not discussed in more detail.

A transport unit control 3, in which the setpoints S for the movement of the transport units TEi are generated, is provided in order to control the movement of the individual transport units TEi. Of course, a plurality of transport unit controls 3, which are each assigned to part of the conveyor device 1, e.g. a conveyor section FAi, and control the movement of the transport units TEi on this part, can equally be provided. In addition, segment control units 4 can also be provided, which are assigned to a conveyor segment FSi (or also to a plurality of conveyor segments FSi or to part of a conveyor segment FSi) and which convert the setpoint commands of the associated transport unit control 3 for a transport unit TEi into control variables, such as into coil currents for example, for the drive coils ASij of the conveyor segment FSi. However, the segment control units 4 could also be implemented in a transport unit control 3. The transport unit control 3, possibly in combination with the associated segment control unit 4, forms the drive axis controller AR of a drive axis Ai.

Positions $p_i$ of the drive axis A, e.g. of the transport units TEi, or equally also velocities $v_i$, are specified as setpoints S. This means that a new setpoint S is calculated for each drive axis A in each cycle step n of the control and is adjusted in the cycle step n by the drive axis controller AR. Accordingly, a suitable controller is implemented in a drive axis controller AR, which converts the setpoint specification in form of the setpoints S, into a suitable control variable for the drive, for example into a force or a coil current as in a conveyor device 1.

The requested path of the transport units TEi along the conveyor line 2 can also be specified by a superordinate conveyor device control 5, in which, for example, a route calculation (which path must a transport unit TEi take?), a track switch arbitration (which transport unit TEi may move into a track switch?), a deadlock prevention (e.g. will two transport units TEi block one another?), etc., can take place in order to move the transport units TEi in the required manner along the conveyor line 2, e.g. in order to realize a manufacturing process, assembly process or other process. This movement specification for the transport units TEi can be converted into a setpoint specification for the transport units TEi in the transport unit control 3.

Figure 3:
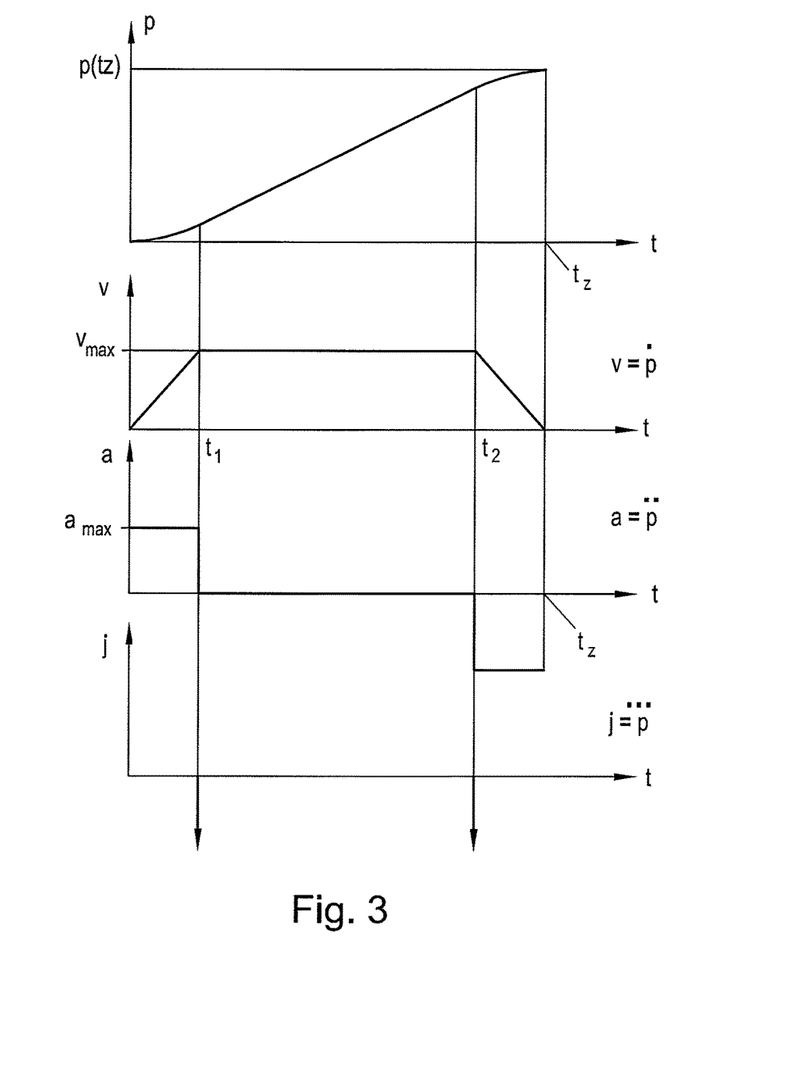
FIG. 3 shows a typical movement profile without smoothing filter.

By way of example, a typical movement profile for the setpoint specification for achieving a target position $p(t_z)$ is shown in FIG. 3 using a transport unit TEi as drive axis Ai as an example. At the beginning of the movement at t=0, the transport unit TEi is accelerated with specified maximum acceleration $a_{max}$ until, at time $t_1$, a specified maximum velocity $v_{max}$ has been reached. From this time $t_1$ the movement is continued at constant velocity $v_{max}$, whereby the position p increases linearly. At time $t_1$ the acceleration is abruptly set from maximum acceleration $a_{max}$ to zero, which causes an infinite jerk j. The time $t_2$, from which the deceleration of the transport unit begins, is chosen such that the transport unit TEi reaches the target position $p(t_z)$ at velocity v=0. An infinite jerk j also occurs at the time $t_2$, at which the deceleration is switched. This jerk j is to be limited by a smoothing filter 10 in the form of an averaging filter.

Generally speaking, the smoothing filter 10 forms the arithmetic mean $\bar{S}$ from $n_R$ previous setpoints S. The filter time $t_R$ is defined as $t_R=(n_R-1)t_a$, with the sampling time $t_a$, which defines the cycle step n. A new setpoint S is calculated at each sampling moment $n \cdot t_a$, that is to say in each cycle step n. If the setpoint profile is thought of as a time-continuous signal S(t), the smoothing filter 10 can be formulated mathematically as a convolution of the setpoint signal S(t) with the function $$\frac{1}{t_R} 1_B, \quad B = [0, t_R]:$$

$$1_B(x) = \begin{cases} 1 & \text{falls } x \in B \\ 0 & \text{sonst} \end{cases}$$

$$\overline{S}(t) = \left(S(t) * \frac{1}{t_R} 1_B\right) = \frac{1}{t_R} \int_{-t_R}^{0} S(\delta - t) d\delta.$$

Figure 4:
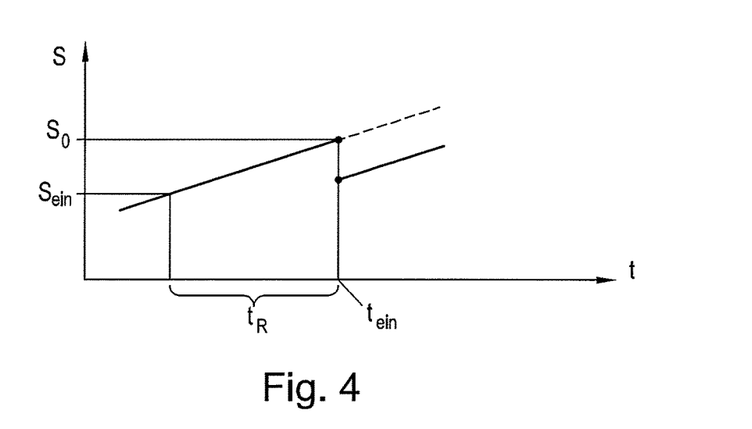
FIG. 4 shows the activation of the smoothing filter without initialization according to the invention.

From this, it can be seen that values of the setpoint signal S(t) for the previous time period $t_R$ are required to calculate the mean value $\overline{S}$. If the smoothing filter 10 were switched on at time $t_{ein}$ (FIG. 4) then, consequently, the setpoint signal S(t) would not be resumed with the current setpoint $S_0$ but with $S_{ein}$, which corresponds to the mean value $\overline{S}$ of the setpoint signal S(t) at the filter time $t_R$ in the past. If no previous setpoint signal $S(t<t_{ein})$ is available, the step would be even more distinct, as then, typically, $S(t<t_{ein})=0$ is assumed. Frequently $S(t<t_{ein})=S_0$ is also assumed, which, however, amounts to a kink in the setpoint profile which leads to a step in the time derivative $\dot{S}$ of the setpoint S, which is undesirable as the movement would not be resumed continuously. This makes it clear that the activation of a conventional smoothing filter 10 as a averaging filter during a movement is problematic and not easily possible.

Figure 5:
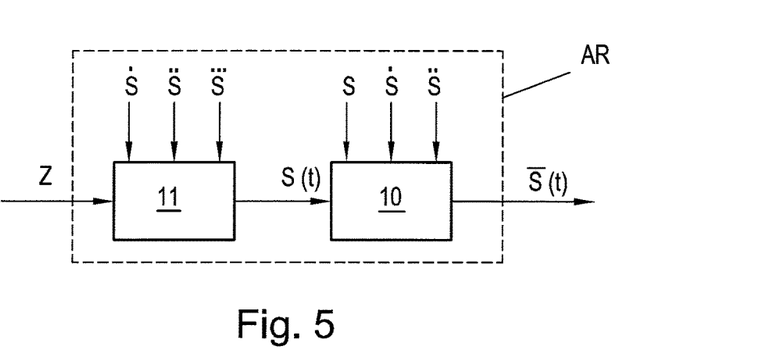
FIG. 5 shows an exemplary embodiment of a drive axis controller with smoothing filter.

The smoothing filter 10 is implemented, for example, in the transport unit control 3, generally in a drive axis controller AR (FIG. 5). A setpoint specification in the form of a chronological sequence of setpoints S(t) is generated from a movement target Z, e.g. a target position $p_z$ or a target velocity $v_z$, in a movement profile unit 11 in the drive axis controller AR or in the transport unit control 3. In doing so, the movement profile unit 11 ensures that limits for time derivatives $\dot{S}$, $\ddot{S}$, $\dddot{S}$ of the setpoint S(t), such as a maximum permissible velocity $v_{max}$, a maximum permissible acceleration $a_{max}$ or a maximum jerk $j_{max}$ for example, are maintained. At the same time, the movement profile unit 11 preferably also ensures a continuous course for the setpoint S(t), e.g. the position p(t) or the velocity v(t). The movement target Z is therefore converted in the movement profile unit 11 into a continuous course of the setpoints S(t) while maintaining specified limits. For example, a position step to specify a new target position $p_z$ is converted into a position and velocity profile as shown in FIG. 3.

However, it is of course equally conceivable that the setpoints S(t) are fed directly to the drive axis controller AR and are not determined in a movement profile unit 11.

An averaging filter has a smoothing effect, i.e. it increases the derivability of the setpoint S(t) by one order. If the input signal in the averaging filter was a two-times continuously differentiable function, then the output of the averaging filter is a three-times continuously differentiable function. This is exactly the effect that is to be achieved with smoothing filter 10. If the input in the smoothing filter 10 is the position signal p(t) according to FIG. 3 for example, then this position signal p(t) can be continuously differentiated once (velocity $v=\dot{p}$), but cannot be continuously differentiated twice (acceleration $a=\ddot{p}$), as the acceleration a(t) is not a continuous function. However, if the position signal p(t) is averaging-filtered, then the averaged position signal $\overline{p}$ can be continuously differentiated twice, that is to say the acceleration a(t) is also a continuous function. Consequently, the time derivative of the continuous acceleration a(t), that is to say the jerk $j=\dddot{p}$, is then limited and not infinite as in FIG. 3.

The x-times continuously differentiable setpoints S(t) are accordingly converted in the subsequent smoothing filter 10 to x+1-times continuously differentiable setpoints S(t) and are output as an output. In doing so, it does not matter to the smoothing filter 10 which setpoint S(t) is applied to the input. If a position signal p(t) or velocity signal v(t) is applied to the input of the smoothing filter 10 as setpoint S(t) as in FIG. 3, then a jerk-limited setpoint $\overline{S}$ is obtained at the output of the smoothing filter 10. If a velocity profile which can be continuously differentiated once and which corresponds to the position signal p(t) in FIG. 3 is applied to the input of the smoothing filter 10 as setpoint S(t), then a setpoint $\overline{S}$ is obtained at the output, the second time derivative of which, that is to say the time derivative of the jerk j, is continuous. The time derivative of the jerk j would be limited thereby, which is often required with cranes.

Generally speaking, with an expected finite input signal, the output of the smoothing filter 10 as an averaging filter is continuous and therefore, in particular, has no steps. At the same time, an averaged setpoint $\overline{S}(t)$ is calculated in each cycle step n.

The procedure according to the invention for initializing the smoothing filter 10 when activated during a movement of the drive axis A is described below for easier understanding in the time domain and for a typical movement phase $(S, \dot{S}, \ddot{S})$ of the movement of the drive axis A.

At time $t_{ein}$ of the activation of the smoothing filter 10, there exists a current movement phase $(S_0, \dot{S}_0, \ddot{S}_0)$, wherein $S_0$ designates the setpoint S(t) at the current time $t_{ein}$. In the example of a position signal p(t) as setpoint S(t), this results in the velocity v(t) as the first time derivative and the acceleration a(t) as the second time derivative and therefore a current movement phase $(p_0, v_0, a_0)$, wherein $p_0$ specifies the current position, $v_0$ the current velocity and $a_0$ the current acceleration. In order to be also able to activate the smoothing filter 10 during the movement, according to the invention, the smoothing filter 10 is initialized in order to achieve the continuation of the current movement phase $(S_0, \dot{S}_0, \ddot{S}_0)$ and a limit of the third time derivative of the setpoint S(t) on activation. In the example of the position signal p(t) as setpoint S(t), this therefore results in a limitation of the jerk j.

On activation, the averaged setpoint $\overline{S}(t)$ as an output signal of the smoothing filter 10 (FIG. 5) is intended to continue the current movement phase $(S_0, \dot{S}_0, \ddot{S}_0)$ continuously, that is to say without a step and while maintaining the kinematic limits, for $t \geq t_{ein}$ independently of the setpoint signal S(t). For this purpose, the smoothing filter 10 is filled with a setpoint profile $S_{init}$ for the time interval $[t_{ein}-t_R, t_{ein}]$ at a filter time $t_R$ in the past so that the characteristics $\overline{S}(t_{ein})=S_0$, $\dot{\overline{S}}(t_{ein})=\dot{S}_0$, $\ddot{\overline{S}}(t_{ein})=\ddot{S}_0$ are fulfilled.

In the simplest case, the second time derivative of the setpoint $\ddot{S}(t)$ for the time interval $[t_{ein}-t_R, t_{ein}]$ is set equal to the current value of the second time derivative of the setpoint $\ddot{S}_0$ of the current movement phase $(S_0, \dot{S}_0, \ddot{S}_0)$, that is to say $\ddot{S}(t)=\ddot{S}_0$. For the mean value at time $t_{ein}$ of the activation of the smoothing filter 10, this results directly in $\ddot{\overline{S}}(t_{ein})=\ddot{S}_0$, whereby part of the above requirement is fulfilled. From $\ddot{S}(t)=\ddot{S}_0$ follows directly, for the first derivative $\dot{S}(t)$ of the setpoint S(t) before time $t_{ein}$ $\dot{S}(t)=\dot{S}(t_{ein})+\ddot{S}_0 t$, wherein, from the specified condition $\dot{\overline{S}}(t_{ein})=\dot{S}_0$, it follows that $$\dot{S}(t_{ein}) = \dot{S}_0 + \frac{t_R}{2}\ddot{S}_0.$$

In turn, the setpoint S(t) is therefore given by $$S(t) = S(t_{ein}) + \dot{S}(t_{ein})t + \frac{\ddot{S}_0}{2}t^2,$$

wherein, from the specified condition $\overline{S}(t_{ein})=S_0$, it follows that $$S(t_{ein}) = S_0 + \frac{\dot{S}(t_{ein})}{2}t_R - \frac{\ddot{S}_0}{6}t_R^2.$$

When all the substitutions are made, the desired previous setpoint signal S(t) for $t=[t_{ein}-t_R, t_{ein}]$, which corresponds to the setpoint profile $S_{init}$ for initializing the smoothing filter 10, is finally obtained as $$S(t) = S_0 + \left(\dot{S}_0 + \ddot{S}_0 \frac{t_R}{2}\right)\left(t + \frac{t_R}{2}\right) + a_0\left(\frac{t^2}{2} - \frac{t_R^2}{6}\right) = S_{init}.$$

In the case of the position signal p(t) as setpoint S(t), the position signal p(t) for the time interval $[t_{ein}-t_R, t_{ein}]$, for example, is then given by $$p(t) = p_0 + \left(v_0 + a_0 \frac{t_R}{2}\right)\left(t + \frac{t_R}{2}\right) + a_0\left(\frac{t^2}{2} - \frac{t_R^2}{6}\right).$$

Naturally, instead of $\ddot{S}(t)=\ddot{S}_0$, a different approach can also be chosen, as long as $\overline{S}(t_{ein})=S_0$, $\overline{\dot{S}}(t_{ein})=\dot{S}_0$, $\overline{\ddot{S}}(t_{ein})=\ddot{S}_0$ is maintained and the movement is continuously continued while maintaining the specified kinematic limits. An alternative suitable function f, the mean value of which corresponds to the current value $\ddot{S}_0$ of the second derivative, can therefore also be chosen for $\ddot{S}(t)$ for the time interval $[t_{ein}-t_R, t_{ein}]$. It must therefore be possible to integrate the function f with respect to time in the time interval $[t_{ein}-t_R, t_{ein}]$ piece by piece.

Here, it must once again be emphasized that S(t) above is only the setpoint profile $S_{init}$ with which the smoothing filter 10 is initialized for the previous time interval $[t_{ein}-t_R, t_{ein}]$. The movement is resumed continuously for the time $t \geq t_{ein}$ based on the setpoints S(t) specified in the drive controller AR while maintaining the kinematic limits, wherein the current movement phase $(S_0,\dot{S}_0,\ddot{S}_0)$ is continued.

Figure 6:
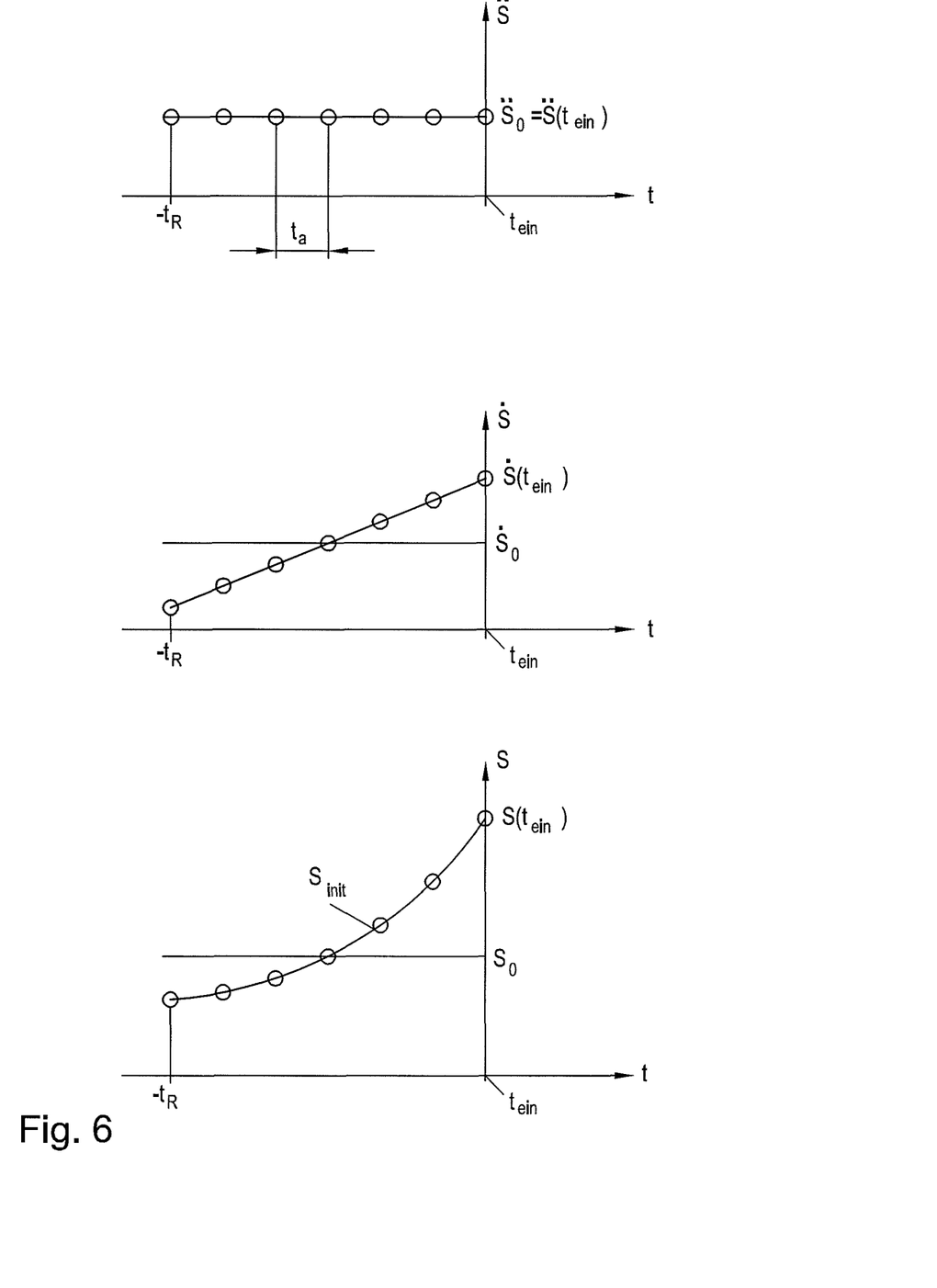
FIG. 6 shows an initialization of the smoothing filter according to the invention.

This is shown in FIG. 6, wherein the smoothing filter 10 has been initialized for the time interval $[t_{ein}-t_R, t_{ein}]$ with the values at each of the sampling times $t_a$. In this way, for example, the movement of the transport unit TEi is continued continuously at the time $t_{ein}$ of activation of the smoothing filter 10. In the case of a position p(t) as setpoint S(t), this results, for example, in a continuous acceleration output of the smoothing filter 10, as a result of which the jerk j is limited. In the case of a velocity v(t) as setpoint S(t), in a similar way, this results, for example, in a continuous jerk output of the smoothing filter 10, as a result of which the change in the jerk j is limited.

Figure 7:
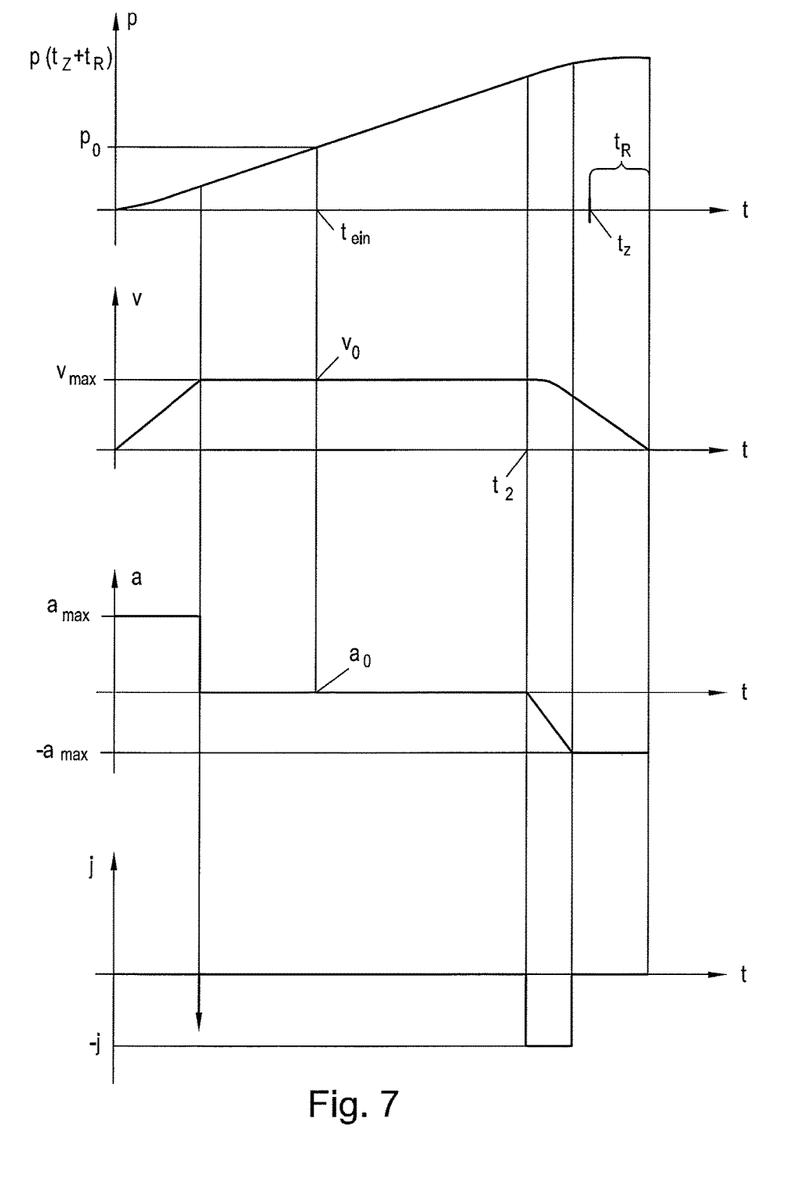
FIG. 7 shows a typical movement profile with initialization of the smoothing filter during the movement.

The effect of the smoothing filter 10 is shown in FIG. 7 using a position signal p(t) as setpoint S(t) as an example.

Once again, a movement profile according to FIG. 3 is generated at the beginning. The smoothing filter 10 is activated at time $t_{ein}$. The current movement phase $(p_0, v_0, a_0)$ is continued after activation. At time $t_2$, the transport unit TEi is decelerated once more, wherein the smoothing filter 10 now intervenes and the acceleration a reduces continuously to the maximum deceleration $-a_{max}$, whereby the resulting jerk j is limited. In FIG. 7, it can also be seen that, as a result of the smoothing filter 10, there is a time delay amounting to the filter time $t_R$, i.e. the desired target position is not reached until the filter time $t_R$ later (compared to FIG. 3 without smoothing filter 10).

The above time-continuous consideration can also be discretized, which is advantageous for implementation in a digital drive controller AR. The time-continuous signals become finite sequences, and arithmetic means are used in place of the convolutions. An index $k \in \{k_{ein}-n_R+1, \ldots, k_{ein}\}$ is now considered in place of the time interval $[t_{ein}-t_R, t_{ein}]$. Otherwise, the approach described above remains the same, that is to say $\overline{S}(k_{ein})=S_0$, $\overline{\dot{S}}(k_{ein})=\dot{S}_0$, $\overline{\ddot{S}}(k_{ein})=\ddot{S}_0$. With $\ddot{S}(k)=\ddot{S}_0$, the first time derivative $\dot{S}(k)$ is given by $\dot{S}(k)=\dot{S}(k_{ein})+\ddot{S}_0 k=\dot{S}(k_{ein})-\ddot{S}_0\cdot|k|$ with $$\dot{S}(k_{ein}) = \dot{S}_0 + \frac{n_R - 1}{2}\ddot{S}_0$$

from the condition $$\dot{S}_0 = \frac{1}{n_R}\sum_k \dot{S}(k).$$

The setpoint sequence S(k) is then given by $$S(k) = S(k_{ein}) - \dot{S}_0 \cdot |k| + \frac{\ddot{S}_0}{2}(|k|^2 - |k|n_R) = S_{init} \text{ with}$$

$$S_0 + \frac{\dot{S}_0}{2}(n_R - 1) + \frac{\ddot{S}_0}{12}(n_R^2 - 1)$$

from the condition $$S_0 = \frac{1}{n_R}\sum_k S(k).$$

In the case of a position signal p(t) as setpoint S(t), the position signal p(k) for the past $\{k_{ein}-n_R+1, \ldots, k_{ein}\}$ is then given by $$p(k) = p(k_{ein}) - v_0 \cdot |k| + \frac{a_0}{2}(|k|^2 - |k|n_R) \text{ with}$$

$$p(k_{ein}) = p_0 + \frac{v_0}{2}(n_R - 1) + \frac{a_0}{12}(n_R^2 - 1)$$

from the condition $$p_0 = \frac{1}{n_R}\sum_k p(k).$$

The smoothing filter 10 can therefore be initialized from only the current movement phase $(S_0,\dot{S}_0,\ddot{S}_0)$ without knowledge of the previous movement profile, so that the movement is continued continuously at the current movement phase $(S_0,\dot{S}_0,\ddot{S}_0)$.

The invention has been described above with a movement phase $(S_0,\dot{S}_0,\ddot{S}_0)$ having three movement components, namely $S_0,\dot{S}_0,\ddot{S}_0$. However, the invention can, of course, also be generalized for other movement phases, with the setpoint S and time derivatives thereof, with more or fewer movement components. If, for example, a movement phase $(S_0, \dot{S}_0)$ having two movement components, for example the position p as setpoint S and the velocity v as time derivative, is used, then the above applies in a similar manner. Likewise in the case with more than three movement components. The approach according to the invention can therefore be generalized as follows for an arbitrary movement phase $(S, \dot{S}, \ldots, S^{(x)})$ with the highest time derivative $$S^{(x)} = \frac{d^{(x)}}{dt^{(x)}}S,$$

with the positive whole number $x \in \mathbb{N}$.

In general, for the initialization of the smoothing filter 10, for the previous time interval $[t_{ein}-t_R, t_{ein}]$ or $\{k_{ein}-n_R+1, \ldots, k_{ein}\}$, a function $f(t)$, $f(k)$, e.g. a constant function $f=const.$, $(S^{(x)}=f)$ is assumed for the highest time derivative of the setpoint $S^{(x)}$ in the movement phase $(S, \dot{S}, \ldots, S^{(x)})$, the mean value $\bar{f}$ of which over the previous time interval $[t_{ein}-t_R, t_{ein}]$ or $\{k_{ein}-n_R+1, \ldots, k_{ein}\}$ corresponds to the current value $S_0^{(x)}$ of the highest time derivative at the time $t_{ein}$ or $k_{ein}$ of activation of the smoothing filter 10, that is to say $\bar{f}=S_0^{(x)}$. It must therefore be possible to integrate the function f with respect to time in the time interval $[t_{ein}-t_R, t_{ein}]$ or $\{k_{ein}-n_R+1, \ldots, k_{ein}\}$ piece by piece. The lower time derivatives $x=\{0, 1, \ldots, x-1\}$ of the movement phase $(S, \dot{S}, S^{(x)})$ are then given by the necessary condition $\bar{S}(t_{ein})=S_0, \bar{\dot{S}}(t_{ein})=\dot{S}_0, \ldots, \overline{S^{(x-1)}}(t_{ein})=S_0^{(x-1)}$ or $\bar{S}(k_{ein})=S_0, \bar{\dot{S}}(k_{ein})=\dot{S}_0, \ldots, \overline{S^{(x-1)}}(k_{ein})=S_0^{(x-1)}$, in order to be able to continue the movement continuously after activation. From this, the setpoint profile $S_{init}$ for initializing the smoothing filter 10 for the time interval $[t_{ein}-t_R, t_{ein}]$ or $\{k_{ein}-n_R+1, \ldots, k_{ein}\}$ can be determined. Here, the zero-order time derivative is, by definition, the setpoint S itself.

Figure 8:
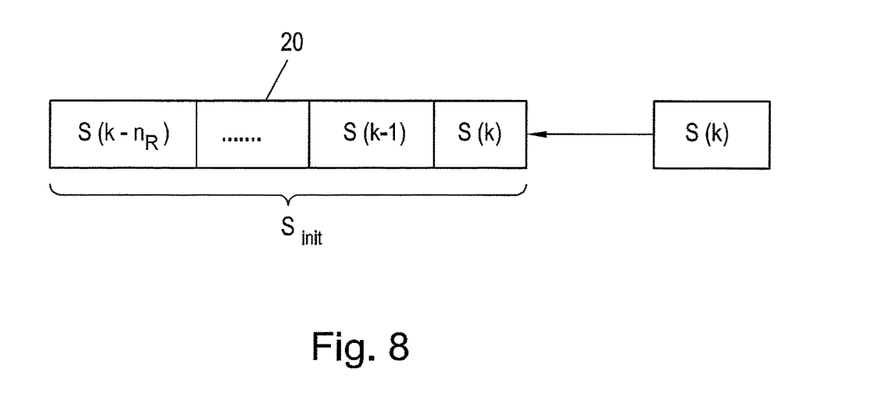
FIG. 8 shows a circular buffer for the setpoint profile for initialization of the smoothing filter.

Initialization of the smoothing filter 10 on activation with the sequence $\{p(k_{ein}-n_R+1), \ldots, p(k_{ein})\}$ requires computational time proportional to $n_R$, that is to say $O(n_R)$. Calculation of the output of the smoothing filter 10 in each cycle step likewise requires $O(n_R)$ time. The computational effort for the smoothing filter 10 is therefore very low. This effort can even be reduced to $O(1)$ if the setpoint $S(k)$ in the sequence $S_{init}$ for initialization is continuously updated in every cycle step n instead of calculating the whole sequence when activating the smoothing filter 10. A circular buffer 20, in which $n_R$ storage locations are provided, can be used for this purpose, and the new value of $S(k)$ of the sequence $S_{init}$ in each case shifts the oldest value of $S(k-n_R)$ out of the circular buffer 20 as indicated in FIG. 8. The circular buffer 20 is implemented, for example in the smoothing filter 10 or in the drive controller AR. Here, it must once again be noted that the setpoint $S(k)$ of the sequence $S_{init}$ is not the same as the current setpoint S for moving the drive axis A, Ai.

The value of the renewed time derivative $S^{(x+1)}$ of the highest time derivative $S^{(x)}$ of the setpoint S in the movement phase $(S, \dot{S}, S^{(x)})$ is limited by the smoothing filter 10 at all times $t \geq t_{ein}$, or $k \geq k_{ein}$. Consequently, in the example of a movement phase (p, v, a), the derivative of the acceleration a, that is to say the jerk j, is limited by the smoothing filter 10. Under the assumption $S^{(x)}_{max}=-S^{(x)}_{min}$, the maximum value of the renewed time derivative is given by $$S^{(x+1)}_{max} = \pm \frac{2 \cdot S^{(x)}_{max}}{(n_R - 1)t_a},$$

or, in the time-continuous case, $$S^{(x+1)}_{max} = \pm \frac{2 \cdot S^{(x)}_{max}}{t_R}.$$

In the case of the acceleration a as the highest time derivative $S^{(x)}$ in the movement phase, the jerk j is limited with $$j_{max} = \pm \frac{2 \cdot a_{max}}{(n_R - 1)t_a},$$

or, in the time-continuous case, with $$j_{max} = \pm \frac{2 \cdot a_{max}}{t_R}.$$

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. Method for controlling the movement of a drive axis (A, Ai) of a drive unit (AE), wherein the movement of the drive axis (A, Ai) is controlled in a cycle step (n) by specifying a setpoint (S(t), S(k)) of the movement, by means of which there results a movement phase ((S(t), $\dot{S}$(t), . . . , S(t)$^{(x)}$), (S(k), $\dot{S}$(k), . . . , S(k)$^{(x)}$)) of the movement of the drive axis (A, Ai), wherein a smoothing filter (10) in the form of an averaging filter calculates the new setpoint as the mean value ($\bar{S}$(t), $\bar{S}$(k)) of the previous setpoints (S(t), S(k)) at a filter time ($t_R$, $n_R$) in the past, wherein the smoothing filter (10) is activated during the movement with a current movement phase (($S_0$, $\dot{S}_0$, . . . , $S_0^{(x)}$)) at a time ($t_{ein}>0$, $k_{ein}>0$), that, for the previous time interval ($[t_{ein}-t_R, t_{ein}]$, $\{k_{ein}-n_R+1, \ldots, k_{ein}\}$), a function (f(t), f(k)) is assumed for the highest time derivative (S(t)$^{(x)}$, S(k)$^{(x)}$) of the setpoint ($\bar{S}$(t), $\bar{S}$(k)) in the movement phase ((S(t), $\dot{S}$(t), . . . , S(t)$^{(x)}$), (S(k), $\dot{S}$(k), . . . , S(k)$^{(x)}$)), the mean value ($\bar{f}$) of which over the previous time interval ($[t_{ein}-t_R, t_{ein}]$, $\{k_{ein}-n_R+1, \ldots, k_{ein}\}$) corresponds to the current value ($S_0^{(x)}$) of the highest time derivative ($S(t)^{(x)}$, $S(k)^{(x)}$) at the time ($t_{ein}$, $k_{ein}$) of activation of the smoothing filter (10), that for the previous time interval $[t_{ein}-t_R, t_{ein}]$, $\{k_{ein}-n_R+1, \ldots k_{ein}\}$), the lower time derivatives (($S(t)$, $\dot{S}(t)$, ..., $S(t)^{(x-1)}$), ($S(k)$, $\dot{S}(k)$, ..., $S(k)^{(x-1)}$)) of the setpoint ($S(t)$, $S(k)$) are given by the condition that the mean values (($\overline{S}, \overline{\dot{S}}, \ldots, \overline{S^{(x-1)}}$)) of the lower time derivatives of the setpoint ($S(t)$, $S(k)$) over the previous time interval ($[t_{ein}-t_R, t_{ein}]$, $\{k_{ein}-n_R+1, \ldots k_{ein}\}$) in each case correspond to the current values (($S_0, \dot{S}_0, \ldots, S_0^{(x-1)}$)) of the lower time derivatives of the setpoint ($S(t)$, $S(k)$) at the time ($t_{ein}$, $k_{ein}$) of activation of the smoothing filter (10), and that on activation, for the previous time interval ($[t_{ein}-t_R, t_{ein}]$, $\{k_{ein}-n_R+1, \ldots, k_{ein}\}$), the smoothing filter (10) is initialized with the calculated setpoints ($S(t)$, $S(k)$) for this previous time interval ($[t_{ein}-t_R, t_{ein}]$, $\{k_{ein}-n_R+1, \ldots, k_{ein}\}$) as setpoint profile ($S_{init}$).

2. The method according to claim 1, wherein, for the previous time interval ($[t_{ein}-t_R, t_{ein}]$, $\{k_{ein}-n_R+1, \ldots k_{ein}\}$), a constant function ($f(t)$, $f(k)$) is assumed for the highest time derivative ($S(t)^{(x)}$, $S(k)^{(x)}$) of the setpoint ($S(t)$, $S(k)$).

3. The method according to claim 1, wherein the setpoint ($S(k)$) of the setpoint profile ($S_{init}$) is updated in every cycle step (n) and stored in a circular buffer (20) with $n_R$ storage locations, wherein the updated setpoint ($S(k)$) shifts the oldest setpoint ($S(k-n_R)$) out of the circular buffer 20), wherein the setpoints ($S(k-n_R), \ldots, S(k)$) stored in the circular buffer (20) form the setpoint profile ($S_{init}$) for initializing the smoothing filter (10).

\* \* \* \* \*